United States Patent
Roberts

(10) Patent No.: US 8,178,176 B1
(45) Date of Patent: May 15, 2012

(54) SEALED LIQUID TISSUE

(76) Inventor: Randy W. Roberts, Harrison Township, MI (US)

( * ) Notice: Subject to any disclaimer, the term of this patent is extended or adjusted under 35 U.S.C. 154(b) by 0 days.

(21) Appl. No.: 13/218,257

(22) Filed: Aug. 25, 2011

(51) Int. Cl.
   *B32B 7/00* (2006.01)
(52) U.S. Cl. ......... 428/34.2; 428/43; 428/154; 428/141; 604/358; 604/292; 15/104.94; 15/208; 15/209.1
(58) Field of Classification Search ............... 428/34.2, 428/43, 154, 141; 604/358, 292; 15/104.94, 15/208, 209.1
   See application file for complete search history.

(56) References Cited

U.S. PATENT DOCUMENTS

| | | | | |
|---|---|---|---|---|
| 2,889,922 A | * | 6/1959 | Clarvoe | 206/484 |
| 3,734,277 A | | 5/1973 | Bucalo | |
| 5,338,590 A | * | 8/1994 | Rodriguez | 428/40.9 |
| 6,537,631 B1 | * | 3/2003 | Rivera et al. | 428/36.91 |
| 2004/0237235 A1 | * | 12/2004 | Visioli et al. | 15/104.94 |

* cited by examiner

*Primary Examiner* — Rena Dye
*Assistant Examiner* — Yan Lan
(74) *Attorney, Agent, or Firm* — Gregory T. Zalecki

(57) ABSTRACT

Sealed liquid tissue is comprised of a length of tissue and a layer of waterproof film. The layer of waterproof film has at least one pocket filled with liquid. The layer of waterproof film is attached to the top surface of the tissue. The bottom surface of the waterproof film is configured so that it has less resistance to bursting under hand pressure than the top surface of the film. Hand pressure applied to the film is capable of causing the bottom surface of the film surrounding the pocket to burst while the top surface of the film remains intact. This causes the liquid within the at least one pocket to escape through the bottom surface of the film to moisturize the length of tissue, thereby forming a wet wipe like article which has a wet lower surface and a dry upper surface.

20 Claims, 4 Drawing Sheets

SEALED LIQUID TISSUE

BACKGROUND

Many people prefer to use wet wipes together with, or in lieu of, toilet paper. This preference is attributable to the fact that wet wipes are wet while toilet paper is dry. One of the problems with wet wipes is that they will dry out if left exposed to the atmosphere. Thus, they cannot simply be wound into a roll for use because the roll will dry out within a short period of time. Therefore, manufacturers and marketers of wet wipes typically package the wet wipes within a sealed container. The problem with this approach is that the sealed container has a manufacturing cost associated with it. Also, the sealed container makes it more difficult for the user to retrieve wet wipes. Sometimes it is difficult to open the container. Other times the feed mechanism for serving up the wet wipes does not function as intended. It may serve multiple wet wipes when only one is desired, or the wet wipes may lose contact with the feed mechanism.

Another problem associated with the traditional packaging of wet wipes is that they must be directly handled by the user. The wet wipes are wet. When the user grasps a wet wipe directly some of the liquid within the wet wipe is transferred to the user—typically the user's hand. Many users prefer to use wet wipes, but prefer to not touch the wet wipes. This is not reasonably possible with the use of commonly available and packaged wet wipes today.

There is a need for an improved wet wipe like article having new features. It would be capable of being dispensed in the same manner that toilet paper is dispensed. It would be separable into hand sized sheets similar to toilet paper. It would be dry when retrieved. When squeezed with hand pressure, liquid would be released onto its lower surface forming a wet wipe like lower surface. Its upper surface would remain dry after the liquid is released.

SUMMARY

These needs are satisfied by the sealed liquid tissue described herein.

Sealed liquid tissue is comprised of a length of tissue, a layer of waterproof film having at least one pocket, and liquid sealed within the at least one pocket. The length of tissue has a top surface and a bottom surface. The pocket is capable of sealing a liquid within the pocket. The layer of waterproof film has a top surface and a bottom surface. The layer of waterproof film is attached to the top surface of the tissue. The bottom surface of the waterproof film is configured so that it has less resistance to bursting under hand pressure than the top surface of the film. Hand pressure applied to the film is capable of causing the bottom surface of the film surrounding the pocket to burst while the top surface of the film remains intact. This causes the liquid within the at least one pocket to escape through the bottom surface of the film to moisturize the length of tissue.

The length of tissue may be fabricated from paper, such as toilet paper. It may be made more tear resistant, especially when wet, by fabricating it from cloth. In the preferred embodiment, one length of tissue is positioned on top of the waterproof film and another length of tissue is placed on the bottom of the waterproof film. The upper length of tissue is optional, but preferred.

Preferably, the waterproof film is comprised of a first layer of waterproof film and a second layer of waterproof film. The first layer of waterproof film is attached to the second layer of waterproof film such that at least one pocket capable of sealing a liquid within the pocket is formed between the film layers. The pockets may be made burstable at their bottom surface by using a thinner layer of material for the second layer of waterproof film compared to the first layer of waterproof film. The second layer of waterproof film is configured so that it has less resistance to bursting under hand pressure than the first layer of film. This configuration is selected so that hand pressure applied to the film layers is capable of causing the second layer surrounding the pocket to burst, while the first layer of film remains intact. This causes the liquid within the at least one pocket to escape through the second layer of film to moisturize the length of tissue. The film layers may be formed from thin sheets of plastic. Cellophane and other cellophane type materials may also be used. Ideally, they waterproof film layers are fabricated from a biodegradable material so that the sealed liquid tissue will biodegrade after use. In order to attach the layers of waterproof film together one or both layers may be heated and the layers sealed together by the application of pressure. Alternatively, an adhesive may be used to attach the first layer of waterproof film to the second layer of waterproof film and to seal the liquid within each pocket.

The layer of waterproof film may have substantially the same length and width as the length of tissue, as shown in FIG. 1. On the other hand, the length of waterproof film may have a smaller length and width compared to the length and width of the tissue, as shown in FIG. 11. Each layer of waterproof film may have one or more liquid filled pockets. The waterproof film is similar to bubble wrap, except that the bubbles/pockets are filled with liquid instead of air.

The tissue and the waterproof film containing the liquid filled pockets may be wrapped around a tube such that they have the shape and appearance of a common roll of toilet paper. This will allow the roll of sealed liquid tissue to be attached to a toilet paper dispenser and retrieved in a similar fashion to the manner in which toilet paper is retrieved. The tissue and waterproof film should have transverse perforations, similar to the transverse perforations contained within common toilet paper. This will allow smaller sections of sealed liquid tissue to be separated for use by tearing those sections away from the remainder of the sealed liquid tissue.

DRAWINGS

These and other features, aspects, and advantages of the present invention will become better understood with regard to the following description, appended claims, and accompanying drawings where:

DESCRIPTION

Figure 1:
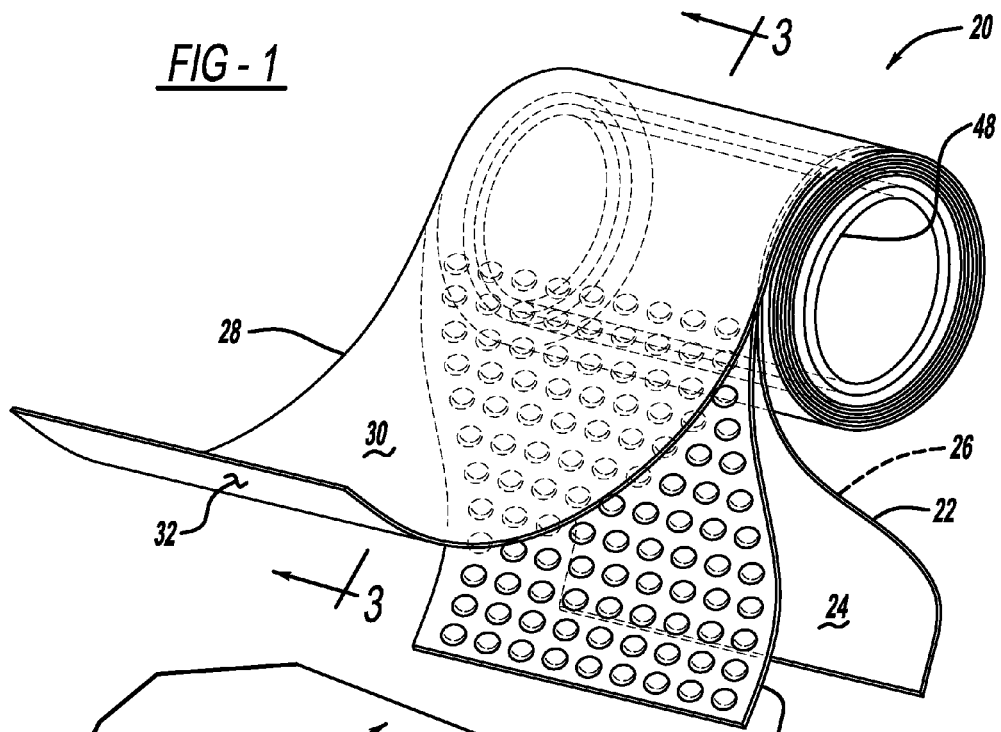
FIG. 1 is a perspective view of one embodiment of a roll of sealed liquid tissue.

The preferred embodiment of sealed liquid tissue 20 is comprised of a lower length of tissue 22, an upper length of tissue 28 and a section of waterproof film 34.

The lower length of tissue 22 forms a wiping surface for the sealed liquid tissue 20. The lower length of tissue 22 has a top surface 24 and a bottom surface 26. The lower length of tissue 22 should have substantially the length and width dimensions of common toilet paper. It may be fabricated from paper, such as toilet paper. Preferably, it is more tear resistant than toilet paper because it will be more prone to tear after it is saturated with liquid contained within the sealed liquid tissue 20. A tear resistant lower length of tissue 22 may be fabricated from a piece of absorbent cloth. The material used for the fabrication of commonly available wet wipes is ideally suited as a fabrication material for the lower length of tissue 22.

The upper length of tissue 28 has a top surface 30 and a bottom surface 32. The upper length of tissue 28 should also have substantially the length and width dimensions of common toilet paper. It may be fabricated from paper, such as toilet paper. It may also be fabricated from a tear resistant material, such as that described with respect to the lower the length of tissue 22, although there is less of a need for tear resistant material within the upper length of tissue 28 because the upper length of tissue 28 typically will remain dry and, therefore, not be as subject to tear resistance degradation as the lower length of tissue 22.

Sealed liquid tissue 20 may also be fabricated without an upper length of tissue 28. In this embodiment, during use, the user grasps the section of waterproof film 34 directly. Thus, the upper length of tissue 28 is an optional element of sealed liquid tissue 20.

Figure 11:
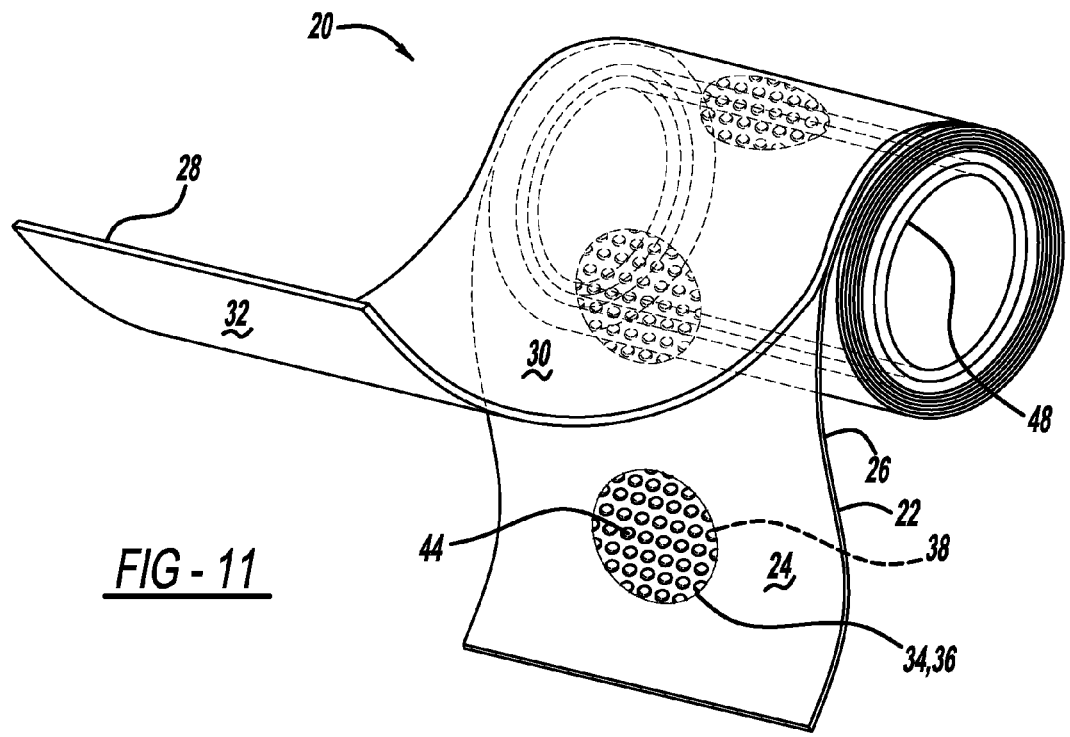
FIG. 11 is a perspective view of an alternate embodiment of a roll of sealed liquid tissue showing a circular shaped wafer of waterproof film encapsulating liquid within a plurality of pockets, wherein the wafer is positioned between an upper length of tissue and a lower length of tissue.

The section of waterproof film 34 may have similar length and width dimensions as compared to the lower length of tissue 22 and the upper length of tissue 28, as shown in FIG. 1. Alternatively, the section of waterproof film 34 may be comprised of discrete sections, wherein each discrete section has length and width dimensions which are smaller than the length and width dimensions of the lower length of tissue 22 and the upper length of tissue 28, as shown in FIG. 11. The section of waterproof film 34 has a top surface 36 and a bottom surface 38.

The section of waterproof film 34 has at least one pocket 44, as shown in FIG. 1, FIG. 2, FIG. 10, FIG. 11 and FIG. 12. The pockets 44 are shaped to seal liquid 46 within them.

Figure 2:
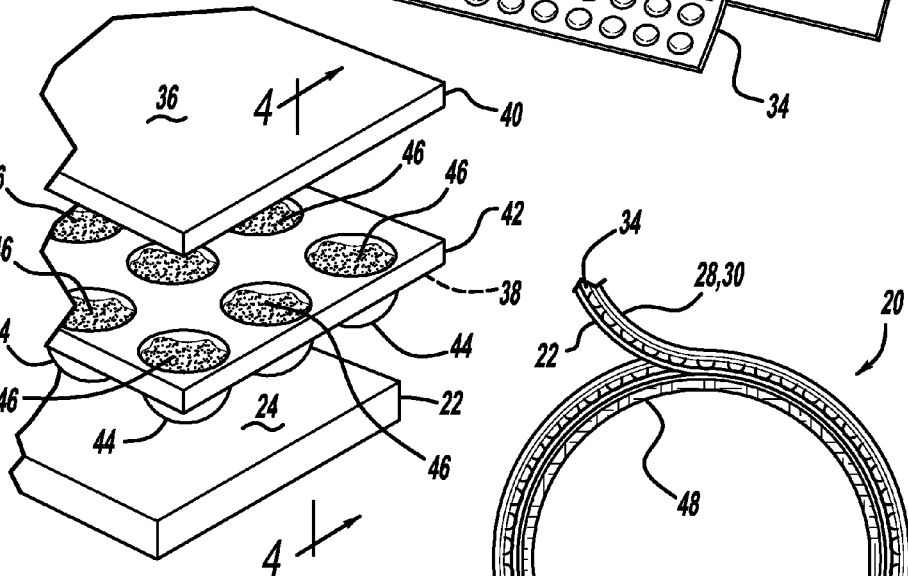
FIG. 2 is a partial exploded sectional view of the layer of waterproof film and the lower length of tissue shown in FIG. 1.
Figure 3:
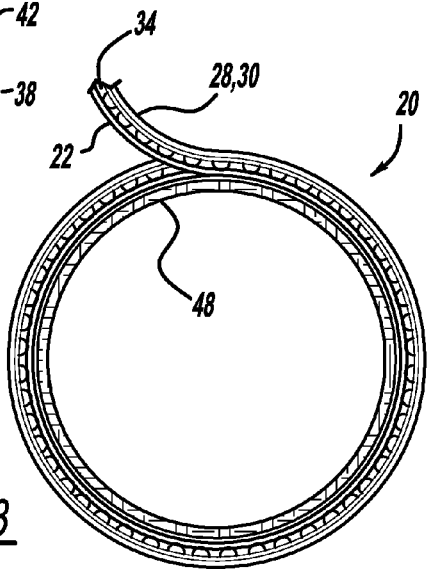
FIG. 3 is a sectional elevation view of the roll of sealed liquid tissue of FIG. 1.
Figure 9:
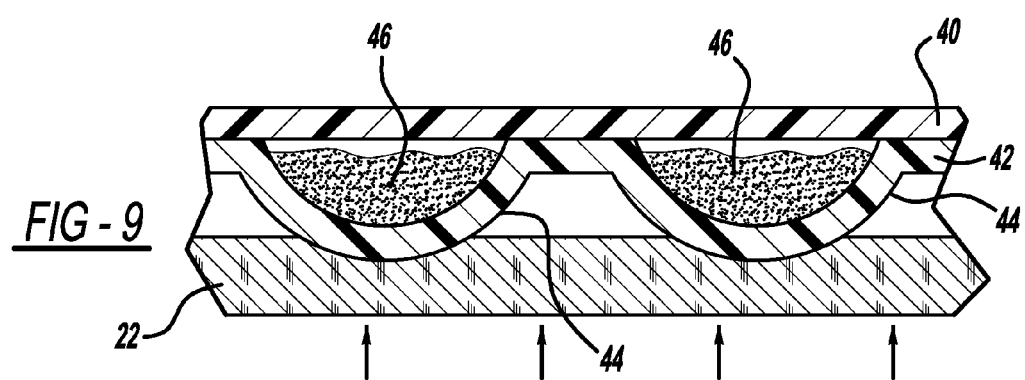
FIG. 9 is a partial elevation view of the first layer of waterproof film and the second player of waterproof film, containing sealed liquid filled pockets, being attached to the lower length of tissue.
Figure 12:
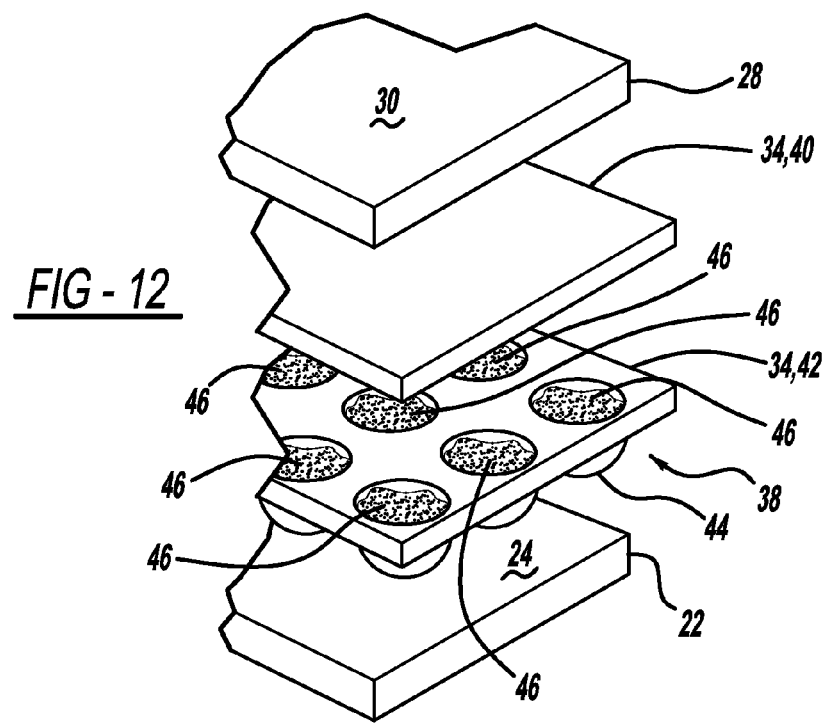
FIG. 12 is a broken away exploded perspective view of the sealed liquid tissue shown in FIG. 1.

Preferably, the section of waterproof film 34 is comprised of a first layer of waterproof film 40 and a second layer of waterproof film 42, as shown in FIG. 2, FIG. 9 and FIG. 12. The second layer of waterproof film 42 is attached to the first layer of waterproof film 40 such that at least one pocket 44 capable of sealing a liquid 46 within the pocket 44 is formed between the film layers 40, 42. The first layer of waterproof film 40 and the second layer of waterproof film 42 may be fabricated from plastic. The film layers 40, 42 may also be fabricated from cellophane. Preferably, the film layers 40, 42 are fabricated from a biodegradable material. This will allow the entire sealed liquid tissue 20 to bio degrade over time after it is used.

Liquid 46 is placed within the pockets 44 of the section of waterproof film 34. The liquid 46 may be water. Preferably, the liquid 46 is the same liquid used within commonly available wet wipes. This will provide an enhanced sterile cleaning solution having a pleasant scent.

Figure 10:
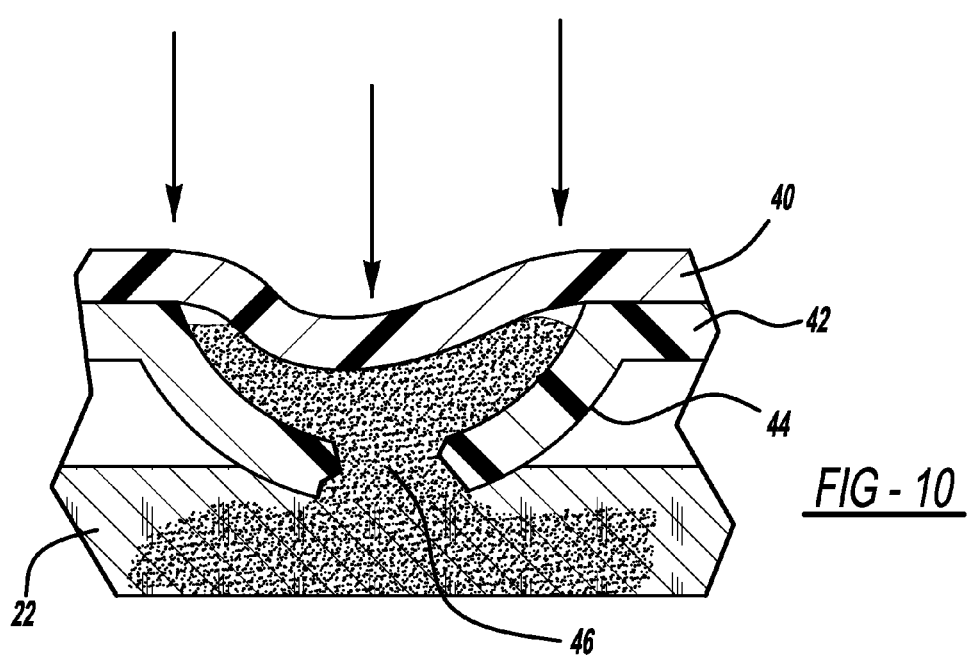
FIG. 10 is a partial elevation view of the first layer of waterproof film, the second layer of waterproof film, and liquid within a pocket formed between the first layer of waterproof film and the second layer of waterproof film, wherein the liquid is shown flowing through a burst section of the second layer of waterproof film into the lower length of tissue.

The bottom surface 38 of the section of waterproof film 34 is configured to have less resistance to bursting under hand pressure than the top surface 36 of the section of waterproof film 34, such that hand pressure applied to the section of waterproof film 34 is capable of causing the bottom surface 38 of this section of film 34 surrounding the pocket 44 to burst while the top surface 36 of this section of film 34 remains intact. This configuration will cause the liquid 46 within the pocket 44 to escape through the bottom surface 38 of the section of waterproof film 34, as shown in FIG. 10. The liquid 46 escaping through the bottom surface 38 of the section of waterproof film 34 causes the liquid to moisturize the lower length of tissue 28, as also shown in FIG. 10. This section of waterproof film 34 is similar to bubble wrap. However, the section of waterproof film 34 contains a liquid 46, rather than air. The section of waterproof film 34 is also configured to burst only at its bottom surface 38 so that the liquid 46 is released onto the lower length of tissue 22, thus moisturizing the lower length of tissue 22. The section of waterproof film 34 is positioned between the top surface 24 of the lower length of tissue 22 and the bottom surface 32 of the upper length of tissue 28, as shown in FIG. 1 and FIG. 11. The top surface 36 of the section of waterproof film 34 should be contiguous with the bottom surface 32 of the upper length of tissue 28. It should also be contiguous with the top surface 24 of the lower length of tissue 22. The upper length of tissue 28, the section of waterproof film 34 and the lower length of tissue 22 should be attached together.

Various techniques are available for attaching the lower length of tissue 22, the section of waterproof film 34 and the optional upper length of tissue 28 together. The tissue 22, 28 and waterproof film 34 may be secured to each other with an adhesive. Heat and pressure may also be applied to the tissue 22, 28 and waterproof film 34 to secure them together. Another approach involves embossing. The tissue 22, 28 and the waterproof film 34 are positioned with respect to each other as previously described. A roller is provided with selectively configured raised surfaces. The raised surfaces on the roller are configured so that when the roller is rolled over a section of tissue 22, 28 properly positioned with respect to a section of waterproof film 34, indentations are impressed into the tissue 22, 28 and the waterproof film 34, thereby attaching the tissue 22, 28 and the waterproof film 34 to each other. As a result, the sealed liquid tissue 20 will have indentations having a similar appearance to the indentations observable on multi-ply toilet paper, wherein the toilet paper plies are secured to each other by embossed indentations. It should be understood that the invention described herein is not limited to the techniques for attaching the tissue 22, 28 to the waterproof film 34 described in this paragraph.

Figure 4:
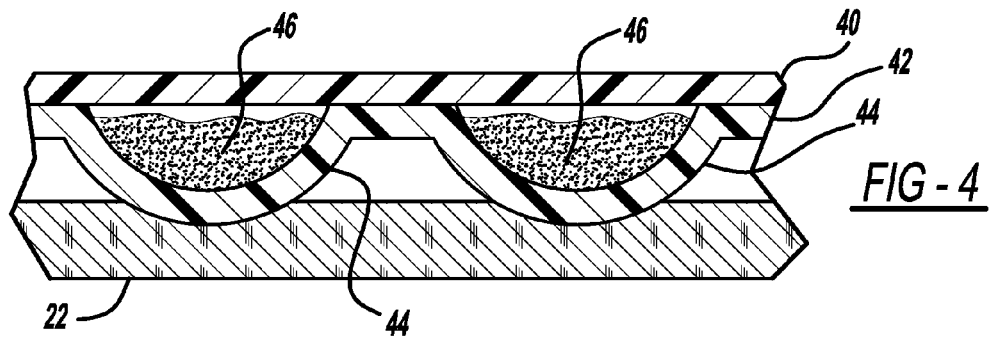
FIG. 4 is a sectional elevation view of the layer of waterproof film of FIG. 2.
Figure 5:
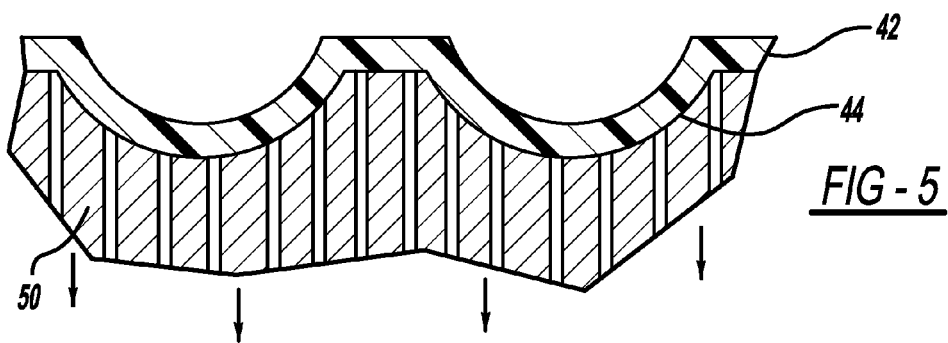
FIG. 5 is a sectional elevation view of the second layer of waterproof film of FIG. 4, positioned on top of a vacuum applying fixture, which forms pockets within the second layer of waterproof film.
Figure 6:
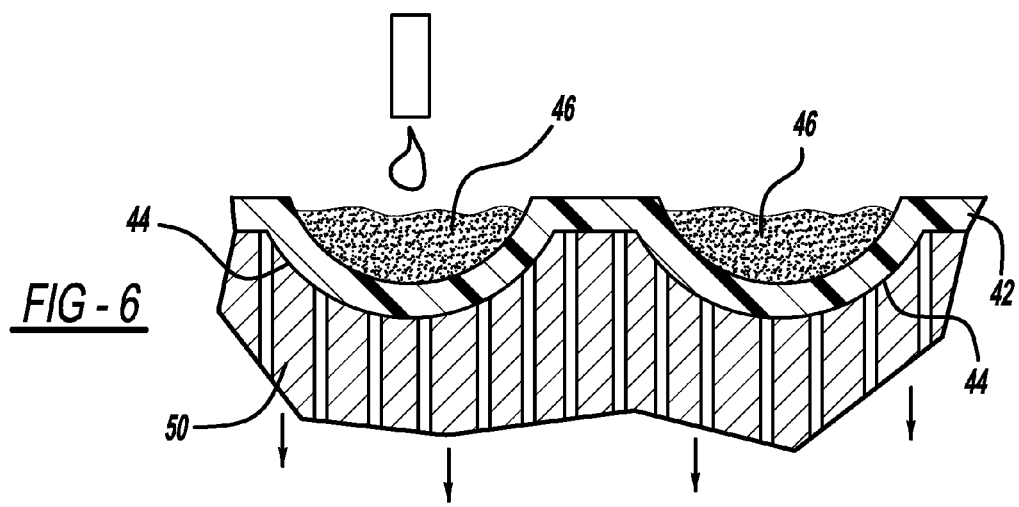
FIG. 6 is a sectional elevation view of the second layer of waterproof film of FIG. 5, showing the deposition of liquid into the pockets.
Figure 7:
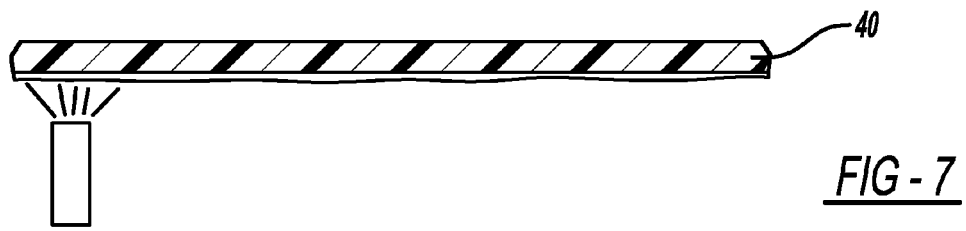
FIG. 7 is a partial elevation view showing the first layer of waterproof film of FIG. 4 being heated to facilitate its attachment to the second layer of waterproof film.
Figure 8:
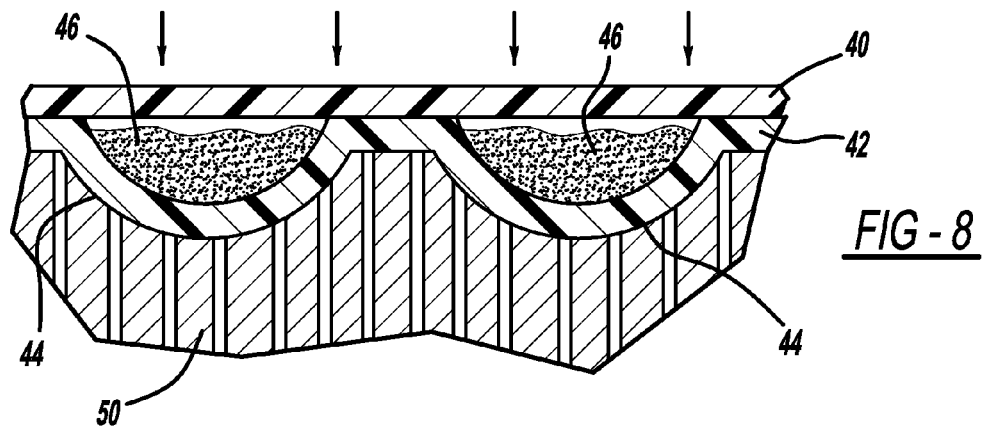
FIG. 8 is a partial elevation view showing the first layer of waterproof film of FIG. 4 being attached to the second layer of waterproof film by the application of pressure.

A method for manufacturing a section of waterproof film 34 and attaching it to a lower length of tissue 22 is illustrated in FIGS. 4-10. FIG. 4 shows the end of the process wherein a section of waterproof film 34 having pockets 44 containing liquid 46 is attached to a lower length of tissue 22. The second layer of waterproof film 42 is positioned on top of a fixture 50. The fixture 50 has depressions in it which form molds for making the pockets, as shown in FIG. 5. The depressions are provided with a vacuum. The vacuum causes the second layer of waterproof film 42 to be sucked into the fixture 50 to form the pockets 44. Liquid 46 is deposited into the pockets, as shown in FIG. 6. The first layer of waterproof film 40 is heated, as shown in FIG. 7. The heated first layer of waterproof film 40 is then pressed onto the second layer of waterproof film 42, as shown in FIG. 8, to form sealed pockets 44 of liquid 46. The first layer of waterproof film 40 may also be attached to the second layer of waterproof film 42 with an adhesive. The section of waterproof film 34 having sealed pockets 44 of liquid 46 is attached to the lower length of tissue 22, as shown in FIG. 9. This may be accomplished by press fitting the section of waterproof film 34 to the lower length of tissue 22. FIG. 10 shows that when pressure is applied to the section of waterproof film 34 having pockets 44 of sealed liquid 46, the second layer of waterproof film 42 bursts and releases the liquid 46. The liquid 46 moisturizers the lower length of tissue 22. The section of waterproof film 34 can be made to burst at the second layer of waterproof film 42, but not the first layer of waterproof film 40, by fabricating the second layer of waterproof film 42 from a thinner layer of material as compared to the first layer of waterproof film 40.

Preferably, the lower length of tissue 22 and the upper length of tissue 28 having the waterproof film 34 therebetween our wound into a roll around a tube 48, as shown in FIG. 1 and FIG. 11. The tube 48 should be in the shape of a common cardboard toilet paper tube. This will allow a roll of sealed liquid tissue 20 to be mounted onto a toilet paper dispenser and removed in the same manner that toilet paper is removed from a toilet paper dispenser. The upper length of tissue 28 should be oriented such that a section of the upper length of tissue 28 is positioned at the outer surface periphery of the roll, as shown in FIG. 1 and FIG. 11.

Preferably, the section of waterproof film 34 is comprised of both a first layer of waterproof film 40 and a second layer of waterproof film 42 attached to the first layer of waterproof film 40 to form at least one pocket 44 capable of sealing a liquid 46 within the pocket 34 between the film layers 40, 42. It should be understood that pockets 44 may be formed into a single layer of waterproof film 34, thus obviating the need to attach two film layers together. The section of waterproof film 34 containing the at least one pocket 44 may be formed as one continuous sheet, as shown in FIG. 1, or, multiple sections of waterproof film 34 containing at least one pocket 44 may be attached to the lower length of tissue 22, as shown in FIG. 11. When discrete sections of waterproof film 34 are used, each section of waterproof film 34 may have one, or more than one, liquid 46 filled pocket 44.

In order to use the sealed liquid tissue 20, a portion of sealed liquid tissue 20 is retrieved. If the sealed liquid tissue 20 has a length greater than a length capable of being comfortably handled, such as when a lengthy section of sealed liquid tissue 20 is wound into a roll around a tube 48, as shown in FIG. 1, a comfortable length of sealed liquid tissue 20 is separated from the remainder of the sealed liquid tissue 20. Preferably, the sealed liquid tissue 20 wound into a roll, as shown in FIG. 1, is provided with transverse perforations such as the transverse perforations provided with respect to common toilet paper. This will allow smaller sections of sealed liquid tissue 20 comprised of tissue 22, 28 and waterproof film 34 to be easily removed and used. After the portion of sealed liquid tissue 20 is retrieved, it is placed in the user's hand with the lower length of tissue 22 positioned distally from the palm of the user's hand. The sealed liquid tissue 20 is then squeezed within the user's palm. This causes the liquid 46 filled pockets 44 to burst at their lower surface, as shown in FIG. 10. When the pockets 44 burst, the liquid 46 within the pockets 44 escapes and moisturizes the lower length of tissue 22. The sealed liquid tissue 20 may then be used as a common wet wipe. However, the palm of the user's hand will remain relatively dry because the liquid 46 is released into the lower length of tissue 22, rather than being released in all directions.

Although the invention has been shown and described with reference to certain preferred embodiments and methods, those skilled in the art undoubtedly will find alternative embodiments and methods obvious after reading this disclosure. With this in mind, the following claims are intended to define the scope of protection to be afforded the inventor, and those claims shall be deemed to include equivalent constructions insofar as they do not depart from the spirit and scope of the present invention.

What is claimed is:

1. A roll of sealed liquid tissue comprising:
   (a) a tube;
   (b) a length of tissue having a top surface and a bottom surface;
   (c) a first layer of waterproof film;
   (d) a second layer of waterproof film attached to the first layer of waterproof film such that at least one pocket capable of sealing a liquid within the pocket is formed between the film layers;
   (e) a liquid sealed within the at least one pocket;
   (f) wherein the second layer of waterproof film is attached to the top surface of the tissue;
   (g) wherein the second layer of waterproof film has less resistance to bursting under hand pressure than the first layer of film, such that hand pressure applied to the film layers is capable of causing the second layer surrounding the pocket to burst while the first layer of film remains intact, thereby causing the liquid within the at least one pocket to escape through the second layer of film to moisturize the length of tissue; and
   (h) wherein the layers of waterproof film and the tissue are wound into a roll around the tube such that a section of the first layer of waterproof film is positioned at the outer surface periphery of the roll.

2. Sealed liquid tissue comprising:
   (a) a length of tissue having a top surface and a bottom surface;
   (b) a layer of waterproof film having at least one pocket capable of sealing a liquid within the pocket, said layer of waterproof film having a top surface and a bottom surface;
   (c) a liquid sealed within the at least one pocket;
   (d) wherein the layer of waterproof film is attached to the top surface of the tissue;
   (e) wherein the bottom surface of the waterproof film has less resistance to bursting under hand pressure than the top surface of the film, such that hand pressure applied to the film is capable of causing the bottom surface of the film surrounding the pocket to burst while the top surface of the film remains intact, thereby causing the liquid within the at least one pocket to escape through the bottom surface of the film to moisturize the length of tissue.

3. The sealed liquid tissue of claim 1, wherein a plurality of pockets are formed between the film layers.

4. The sealed liquid tissue of claim 2, wherein the tissue is paper.

5. The sealed liquid tissue of claim 2, wherein the tissue is cloth.

6. The sealed liquid tissue of claim 2, wherein the film layers are fabricated from plastic.

7. The sealed liquid tissue of claim 2, wherein the film layers are fabricated from cellophane.

8. The sealed liquid tissue of claim 2, wherein the film layers are biodegradable.

9. The sealed liquid tissue of claim 2, wherein the liquid is water.

10. The sealed liquid tissue of claim 2, wherein the layer of waterproof film has a plurality of pockets.

11. Sealed liquid tissue comprising:
    (a) a lower length of tissue having a top surface and a bottom surface;
    (b) an upper length of tissue having a top surface and a bottom surface;
    (c) a section of waterproof film having at least one pocket capable of sealing a liquid within the pocket, said section of waterproof film having a top surface and a bottom surface;
    (d) a liquid sealed within the at least one pocket;
    (e) wherein the section of waterproof film is positioned between the top surface of the lower length of tissue and the bottom surface of the upper length of tissue such that the top surface of the film is contiguous with the bottom surface of the upper length of tissue and the bottom surface of the film is contiguous with the top surface of the lower length of tissue; and
    (f) wherein the bottom surface of the section of waterproof film has less resistance to bursting under hand pressure than the top surface of the section of film, such that hand pressure applied to the section film is capable of causing the bottom surface of the section of film surrounding the pocket to burst while the top surface of the section of film remains intact, thereby causing the liquid within the at least one pocket to escape through the bottom surface of the section of film to moisturize the lower length of tissue.

12. The sealed liquid tissue of claim 11, further comprising a tube wherein the lower length of tissue and the upper length of tissue having the waterproof film therebetween are wound into a roll around the tube such that a section of the upper length of tissue is positioned at the outer surface periphery of the roll.

13. The sealed liquid tissue of claim 11, wherein the section of waterproof film is comprised of a first layer of waterproof film and a second layer of waterproof film attached to the first layer of waterproof film such that at least one pocket capable of sealing a liquid within the pocket is formed between the film layers.

14. The sealed liquid tissue of claim 11, wherein a plurality of sections of waterproof film each having at least one pocket capable of sealing a liquid within the pocket are positioned between the top surface of the lower length of tissue and the bottom surface of the upper length of tissue.

15. The sealed liquid tissue of claim 11, wherein the section of waterproof film has a plurality of pockets capable of sealing a liquid within each pocket.

16. The sealed liquid tissue of claim 11, wherein the lower length of tissue is tear resistant when moisturized and subjected to a hand applied and pressured wiping motion.

17. The sealed liquid tissue of claim 11, wherein the section of waterproof film is fabricated from plastic.

18. The sealed liquid tissue of claim 11, wherein the section of waterproof film is fabricated from cellophane.

19. The sealed liquid tissue of claim 11, wherein the section of waterproof film is biodegradable.

20. The sealed liquid tissue of claim 11, wherein the liquid is water.

* * * * *